(12) United States Patent
Tsao

(10) Patent No.: US 7,869,041 B2
(45) Date of Patent: Jan. 11, 2011

(54) COLOR MEASUREMENT INSTRUMENT

(76) Inventor: Ming-Sen Tsao, P.O. Box 215, Taichung (TW) 40099

( * ) Notice: Subject to any disclaimer, the term of this patent is extended or adjusted under 35 U.S.C. 154(b) by 241 days.

(21) Appl. No.: 12/230,641

(22) Filed: Sep. 3, 2008

(65) Prior Publication Data

US 2009/0279092 A1      Nov. 12, 2009

(30) Foreign Application Priority Data

May 9, 2008      (TW) .............................. 97208121 U

(51) Int. Cl.
*G01J 3/46*      (2006.01)
(52) U.S. Cl. ..................................... 356/402
(58) Field of Classification Search ....................... None
See application file for complete search history.

(56) References Cited

U.S. PATENT DOCUMENTS 4,974,810 A * 12/1990 Fiske ......................... 250/216

2009/0180117 A1 * 7/2009 Clark et al. .................. 356/402

\* cited by examiner

*Primary Examiner*—Tu T Nguyen

(57) ABSTRACT

The color measurement instrument includes an illumination system and a sensing system. The illumination system is composed of a light emitting element and a light pipe. The light pipe has an incident surface at an illuminating end of the light emitting element and an ejected surface adjacent to a sensing platform of a sensing system. The sensing system includes a light collection device and a sensing platform for disposing a testing object. The light collection device includes an aperture stop for adjusting the shape of a light spot on a color sensor, a light collection lens set for detecting and projecting an image of a testing object on the sensing platform, a field stop for separating a light from an area, an uniform lens set for spreading the image on the field stop, and a color sensor for capturing and analyzing the color to adjust the brightness.

13 Claims, 7 Drawing Sheets

COLOR MEASUREMENT INSTRUMENT

FIELD OF THE INVENTION

The present invention relates to a measurement instrument, and more particularly to a novel color measurement instrument.

BACKGROUND OF THE INVENTION

In an existing prior art related to a color measurement instrument as disclosed in the U.S. Pat. No. 7,262,853 B2, an illumination system is disposed perpendicularly to an internal side of a casing, and a sensor is installed slantingly on another side of the casing. The illumination system comprises an illuminator, a tube, an upper end connected to the illuminator, a lower end having a convex lens, and the central line of the convex lens aligned with a sample. The sensor comprises a flat lens having its central line aligned with the sample, an aspherical lens installed at the top of the flat lens, and an optoelectronic diode installed at an upper end of the aspherical lens.

The drawback of the aforementioned structure resides on that the illuminator of the illumination system projects light radially onto the sample directly through the tube and the convex lens, and thus the light projected at the center of the projected area is stronger, and the light projected at the periphery of the projected area is weaker, and the uniformity of the light projected onto the projected area is affected adversely. Furthermore, the whole illumination system is installed linearly with the sample, such that after the illumination system is turned on, a strong light reflected from the center of the sample will be received, and the temperature at the area of the illumination system will rise rapidly. As a result, the components in the system will be damaged easily. The illuminating light, the convex lens and the sample are aligned linearly, such that after a light is projected onto the sample, the light is diffused progressively outward and then reflected, and such phenomenon causes the sensor to receive a majority of reflected light directly from the aforementioned reflected light, so that after an optoelectronic diode receives an image signal, there are substantial drawbacks on the shape of a light spot and the color distortion of an image.

In view of the foregoing drawbacks of the prior art, the inventor of the present invention based on years of experience in the related industry to conduct extensive researches and experiments, and finally developed a color measurement instrument in accordance with the present invention to overcome the drawbacks.

SUMMARY OF THE INVENTION

It is a primary objective of the present invention to overcome the shortcomings of the prior art by providing a color measurement instrument comprising: an illumination system and a sensing system. The illumination system is composed of a uniform white light LED and a light pipe, and the light emitting element is a light emitting diode, and the light pipe has an incident surface disposed on an illuminating end of the light emitting element, and an ejected surface aligned with a sensing platform of the sensing system, wherein the light pipe has a sufficient length to uniformly mix the non-uniform white light coming from the light emitting element, and the central line of the light pipe is inclined with respect to the sensing platform of the sensing system to avoid reflected lights from being collected directly by the sensing system. The illumination system simply uses a light emitting element as the main light source and effectively reduces the number of illuminating elements, and thus the overall structure not only lowers the cost, but also reduces the size. With the design of a light pipe, the invention achieves the effects of reducing the quantity of illuminating elements and waiving their layout, so that the overall mechanical dimensions of the color measurement instrument can be minimized.

Another objective of the present invention is to provide a color measurement instrument, wherein the sensing system comprises a sensing platform and a light collection device; and the light collection device sequentially comprises an aperture stop, a light collection lens set, a field stop, a uniform lens set and a color sensor. With the light collection device, the true color of a testing object on the sensing platform can be projected and distributed uniformly onto the color sensor. The color sensor captures and analyzes the color to adjust the brightness and chroma and output an analysis signal. The sensing system can shorten or extend the distance between the testing platform and the light collection device, while maintaining the function of accurately capturing the color of a testing object.

To achieve the foregoing objectives, the present invention provides a color measurement instrument that uses a light emitting element as a base of the main light source and comprises:

an illumination system, composed of a light emitting element and a light pipe, wherein the light emitting element is a light emitting diode, and the light pipe has an incident surface disposed at an illuminating end of the light emitting element and an ejected surface slantingly guided to the testing platform of the sensing system, and both incident surface and ejected surface are aspherical protruding arc surfaces;

a sensing system, comprising a testing platform and a light collection device, wherein the testing platform is provided for disposing a testing object, and the light collection device comprises an aperture stop installed with an appropriate distance from an upper end of the sensing platform for adjusting or changing the shape of a light sport on the color sensor to avoid glare; a light collection lens set, installed with an appropriate distance from an upper end of the aperture stop for projecting an image of the testing object on the sensing platform to the field stop; a field stop, installed at an upper end of the light collection lens set for separating light coming from an area other than the effective sensing area of the sensing platform to improve the accuracy of the measurement; a uniform lens set, installed at an upper end of the field stop for uniformly spreading each light spot of the image on the field stop uniformly over the whole color sensor; and a color sensor, installed at an upper end of the uniform lens set, for capturing and analyzing the color of the testing object to adjust the brightness and chroma, and output an analysis signal.

DETAILED DESCRIPTION OF THE PREFERRED EMBODIMENTS

To make it easier for our examiner to understand the technical characteristics of the present invention, we use a preferred embodiment with accompanying drawings for a detailed description of the present invention as follows.

Figure 1:
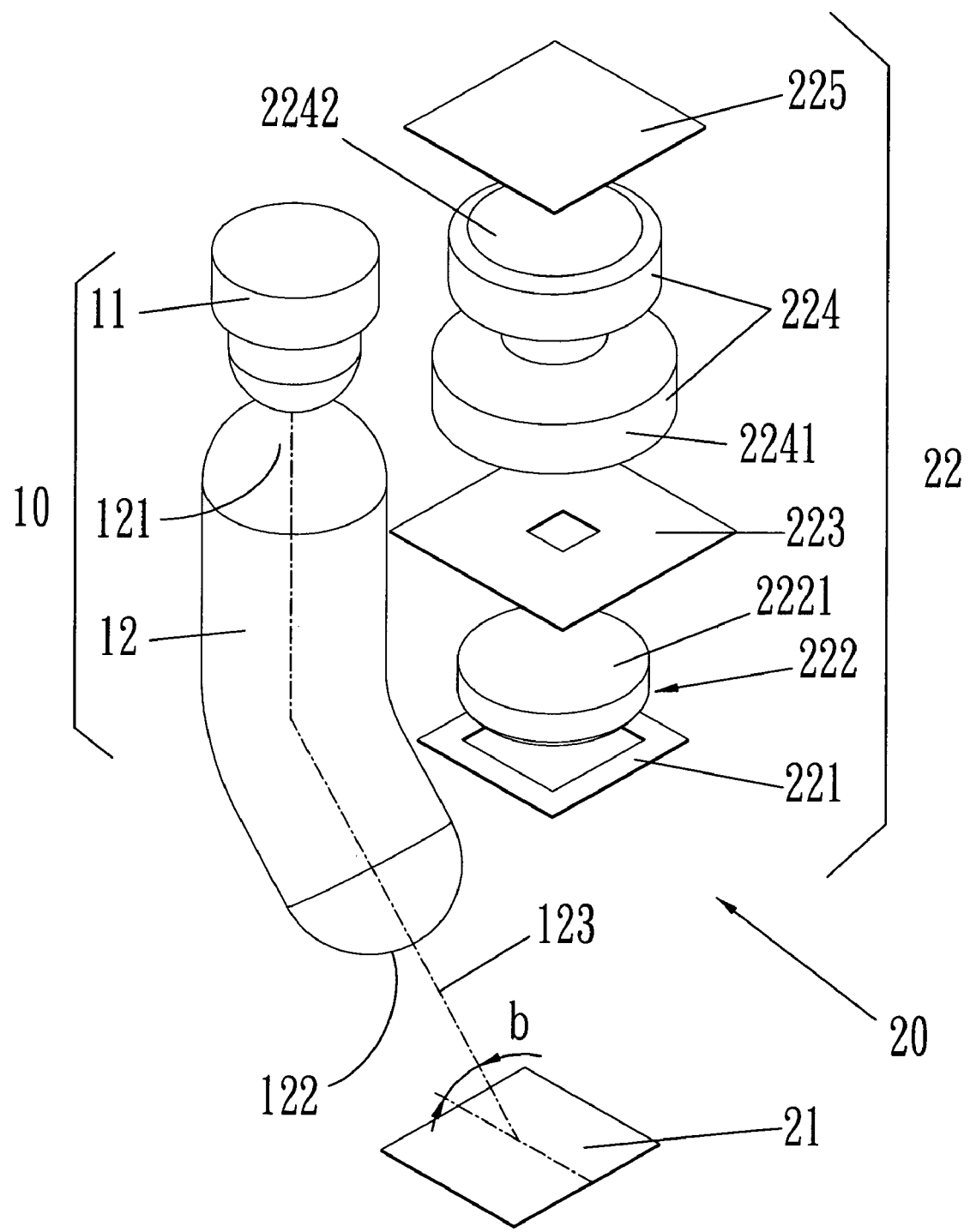
FIG. 1 is a perspective view of a relative installation position of a color measurement instrument in accordance with a preferred embodiment of the present invention.
Figure 2:
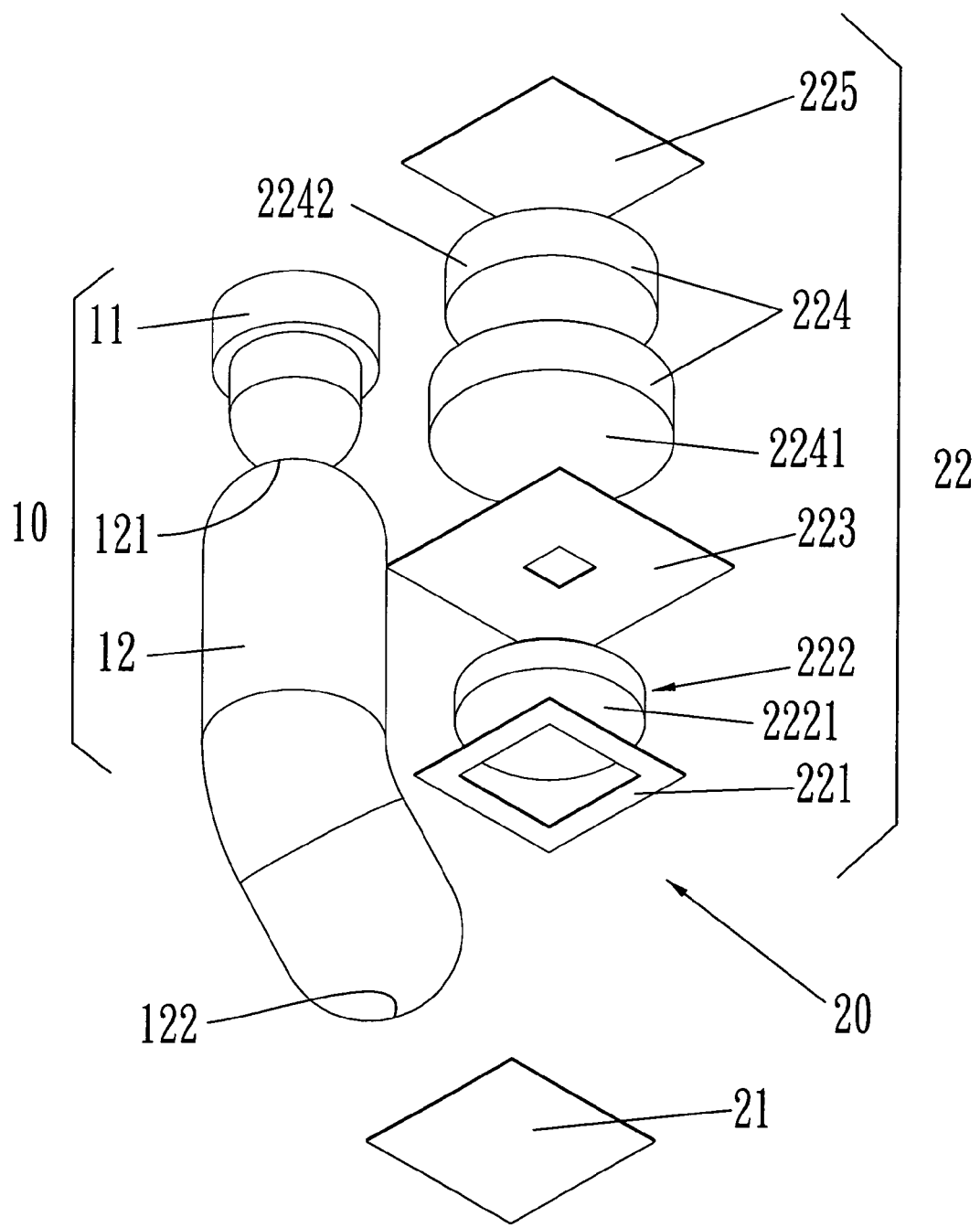
FIG. 2 is a perspective view of FIG. 1 viewed at another angle.
Figure 3:
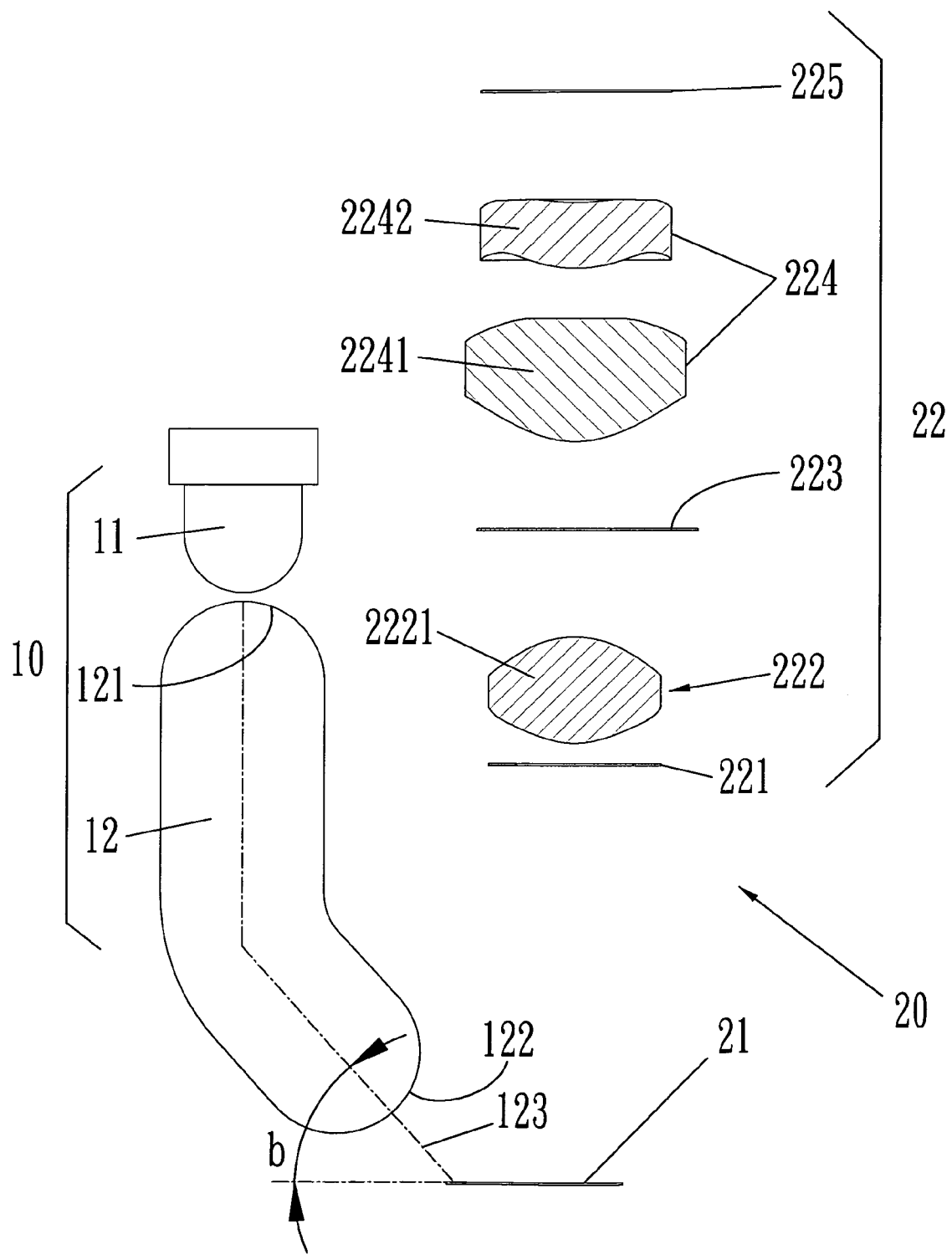
FIG. 3 is a front view of a relative installation position of a color measurement instrument in accordance with a preferred embodiment of the present invention.

With reference to FIGS. 1 to 3 for a color measurement instrument in accordance with a preferred embodiment of the invention, the color measurement instrument comprises an illumination system 10 and a sensing system 20.

The illumination system 10 comprises a light emitting element 11 and a light pipe 12, wherein the light emitting element 11 is a light emitting element such as a light emitting diode capable of producing a white light, and the blue light LED pumps a yellow phosphor to form the white light, and the light pipe 12 is a light pipe with a sufficient length for uniformly mixing the white light coming from the light emitting element 11. In addition, distal ends of the light pipe 12 are an incident surface 121 and an ejected surface 122 respectively, and both incident surface 121 and ejected surface 122 are aspherical protruding arc surfaces, wherein the incident surface 121 is disposed at an illuminating end of the light emitting element 11, and the ejected surface 122 is slantingly guided to align with the sensing platform 21 of the sensing system 20, such that an included angle b between the axial central line 123 of an ejected light and the sensing platform 21 falls within a range from 40° to 50°, and preferably at 45° to prevent the reflected light from being collected directly by the sensing system 20.

The sensing system 20 installed substantially parallel to the illumination system 10 comprises a sensing platform 21 and a light collection device 22.

The sensing platform 21 is provided for disposing a testing object, and the illumination system 10 is provided for projecting a white light uniformly onto the whole area of the sensing platform 21.

The light collection device 22 sequentially comprises an aperture stop 221, a light collection lens set 222, a field stop 223, a uniform lens set 224 and a color sensor 225, wherein the aperture stop 221 is disposed with an appropriate distance from an upper end of the sensing platform 21 for adjusting the shape of the light spot on the color sensor 225 to avoid extra light that causes a glare, and the light collection lens set 222 is disposed with an appropriate distance from an upper end of the aperture stop 221, and the light collection lens set 222 comprises one or more convex lenses 2221, and both upper and lower distal surfaces of the convex lens 2221 are aspherical protruding arc surfaces provided for detecting and collecting the light of an object projected by the white light of a testing object from the sensing platform 21, so as to project an image of the testing object onto the field stop 223; and the field stop 223 is disposed at an upper end of the light collection lens set 222 for blocking the light other than those from the effective sensing area of the sensing platform 21 to restrain unwanted lights, so as to improve the accuracy of the measurement. The uniform lens set 224 disposed at a distance from an upper end of the field stop 223 comprises two or more lenses, and the two lenses are a first lens 2241 and a second lens 2242 respectively, and upper and lower distal surfaces of the first lens 2241 are aspherical protruding arc surfaces, wherein the upper protruding arc surface is lower than the lower protruding arc surface, and the second lens 2242 includes a concave ring at the center, an upper curved surface of a protruding arc ring at the periphery, a protruding arc ring status formed at the center of the lower curved surface, and a concave ring status formed at the periphery, such that each spot of an image on the field stop 223 can be spread over the whole color sensor 225 through the uniform lens set 2241, and the color sensor 225 is disposed at an upper end of the uniform lens set 224 for capturing and analyzing the color to adjust the brightness and chroma and output the analysis signal.

Figure 4:
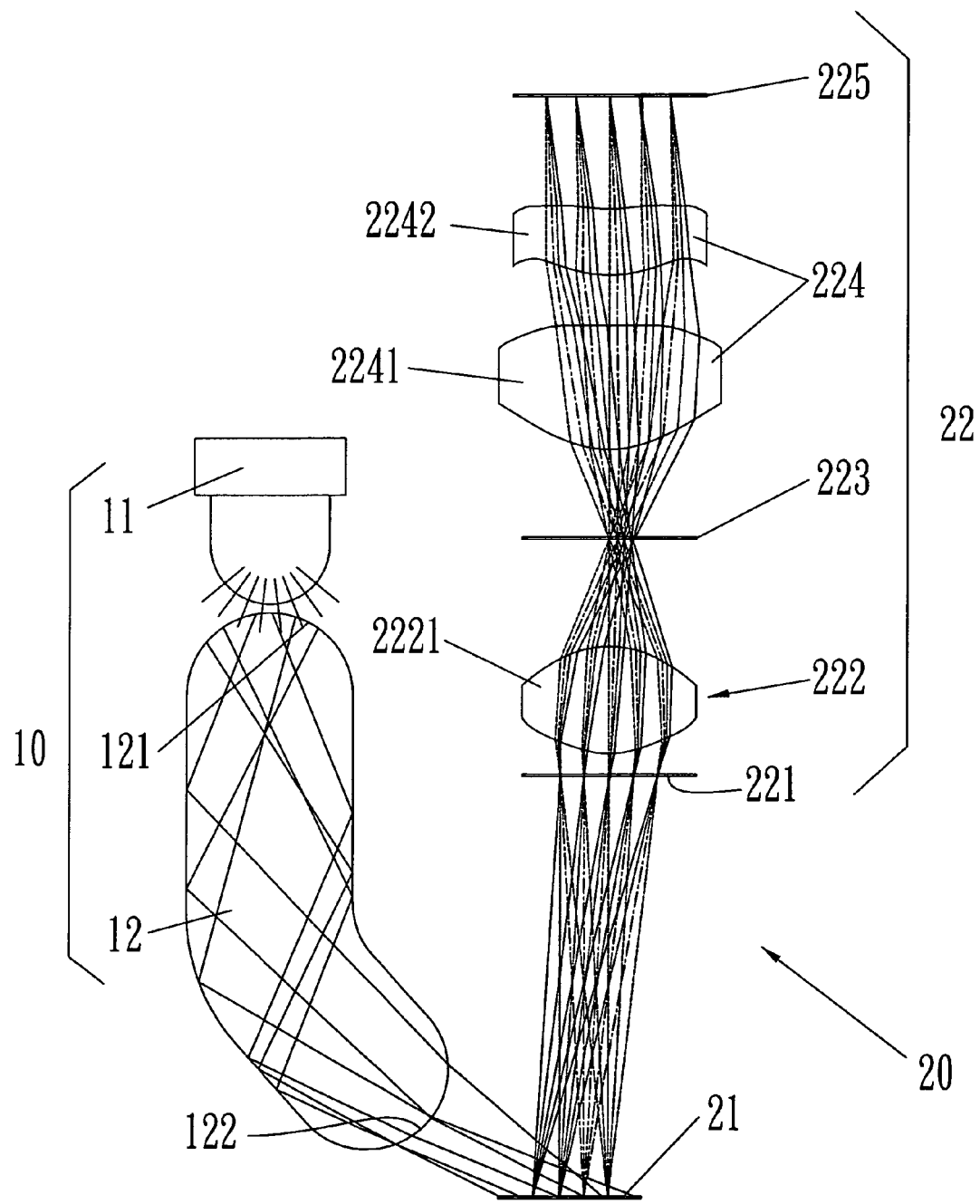
FIG. 4 is a schematic view of a related projection of a color measurement instrument in accordance with a preferred embodiment of the present invention.

With the aforementioned components as shown in FIG. 4, the illumination system 10 can provide a uniform white light, and the light emitting element 11 guided by the light pipe 12 coated with non-uniform phosphor causes non-uniformly mixed colors, and an included angle b of the ejected light between the aslant illuminating angle and the sensing platform 21 falls within a range from 40° to 50°, and both incident surface 121 and ejected surface 122 of the light pipe 12 are aspherical protruding arc surfaces, and thus the illumination intensity of the white light can be spread uniformly over the whole area of the sensing platform 21. With the light collection device 22 of the sensing system 20, the true color of a testing object on the sensing platform 21 can be projected effectively and uniformly onto the color sensor 225, and the color sensor 225 is provided for capturing and analyzing the color to adjust the brightness and chroma and output an analysis signal.

In addition to the novel technology of simply using a light emitting element 11 for illumination, the illumination system also reduces the quantity of installed light emitting elements 11. As to the overall structure, the invention not only lowers the cost, but also reduces the size. With the design of the light pipe 12, the quantity of light emitting elements 11 can be reduced, and their layout can be waived, so that the overall mechanical dimensions of the color measurement instrument of the invention can be minimized. The length of the aforementioned light pipe 12 must be sufficient to uniformly mix the white light coming from the light emitting element 11, wherein the length of the light pipe 12 is slightly smaller than the total length of the light collection device 22 of the sensing system 20, and the middle of the light pipe 12 must have a bent section not provided for restricting the shape of the light pipe 12, but primarily refracting the light continuously by the light emitting element 11 through the light pipe 12 and spreading the light over the whole area of the sensing platform 21. Therefore, the present invention can adopt an erected light pipe 12 and adjust the light emitting element 11 to enter the light from the incident surface 121 through an inclined angle, so as to achieve the foregoing effect. In addition, the external appearance of the aperture stop 221 and the field stop 223 of the light collection device 22 must be corresponsive to the shape and profile of the color sensor 225. In this preferred embodiment, the design of the color sensor 225 is in a rectangular shape, and thus the aperture stop 221 and the field stop 223 are also rectangular, and the size of the field stop 223 corresponds to the size of the aperture stop 221 of the light collection lens set 222 which is adjusted appropriately to achieve the result of providing a constant light intensity signal at the color sensor when the distance of a testing object varies.

Figure 5:
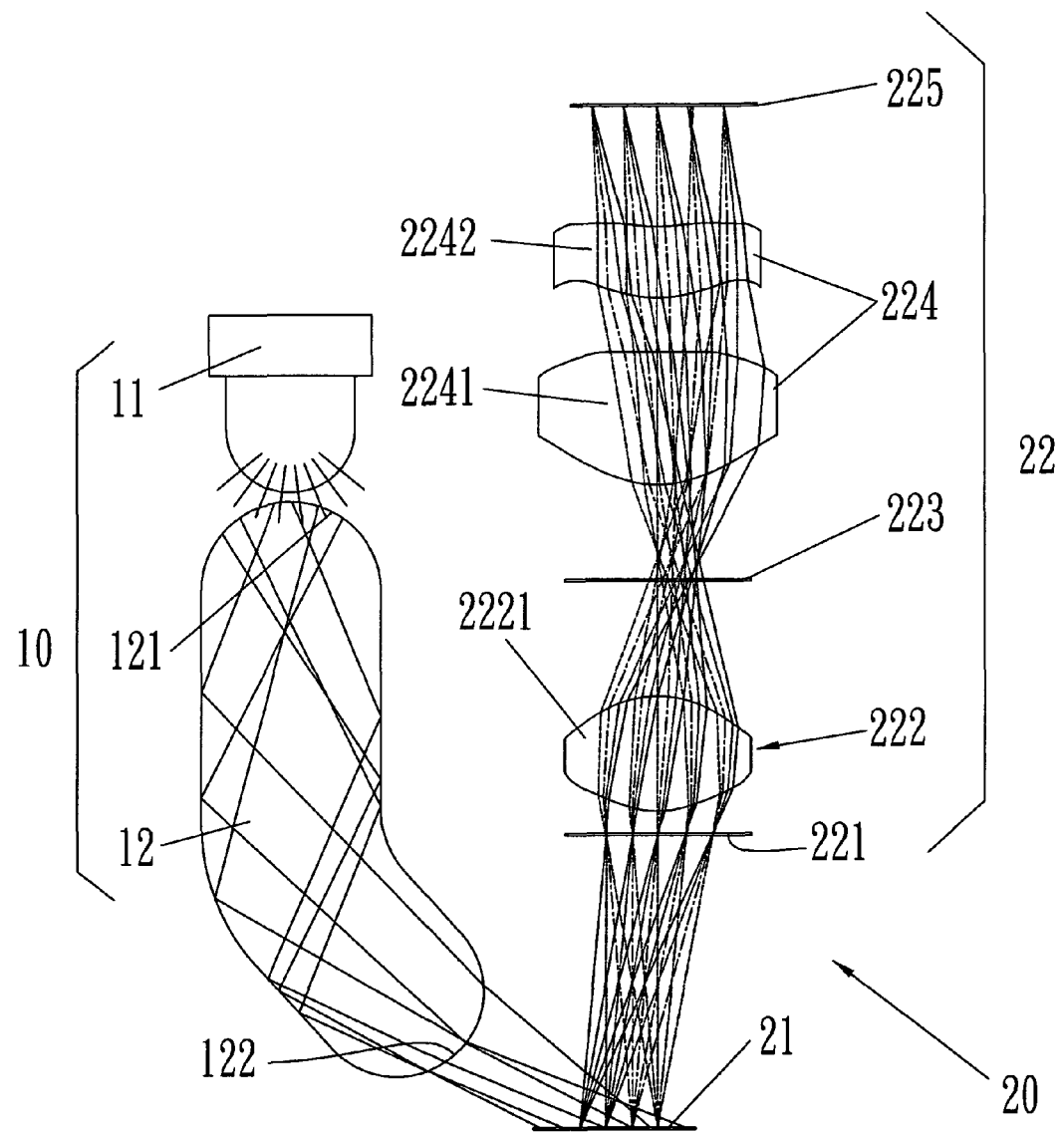
FIG. 5 is another schematic view of a related projection of a color measurement instrument in accordance with a preferred embodiment of the present invention.

With reference to FIGS. 4 and 5 for the distance between the light collection device 22 and the sensing platform 21 of the sensing system 20 of the color measurement instrument in accordance with the present invention, the distance can be shortened or extended, such that a larger tolerance is allowed between the testing object on the sensing platform 21 and the light collection device 22, while maintaining the functions of capturing the true color of the testing object and maximizing the utility of the spatial design of the color measurement instrument. In a general optical system having an aperture stop, a testing sample usually has a larger flux at a short distance and a smaller flux at a long distance in an environment with constant brightness. The light collection device 22 adopts the design of a fixed aperture stop 221, such that the image distance of a testing object at a longer distance is shorter than the image distance of a testing object at a shorter distance. If the field stop 223 is placed on an image surface of a farther testing object, a portion of the lights of the image of the closer testing object is restrained by the field stop 223 and cannot be passed or reached to the color sensor 225, and thus the flux of the closer testing object is restrained and lowered. Such arrangement breaks through the traditional design of having a larger flux of the testing sample at a closer distance. If both aperture stop 221 and field stop 223 are balanced, the color measurement instrument can achieve the effect of having the sensing platform 21 at different positions while maintaining a constant total power.

Figure 6:
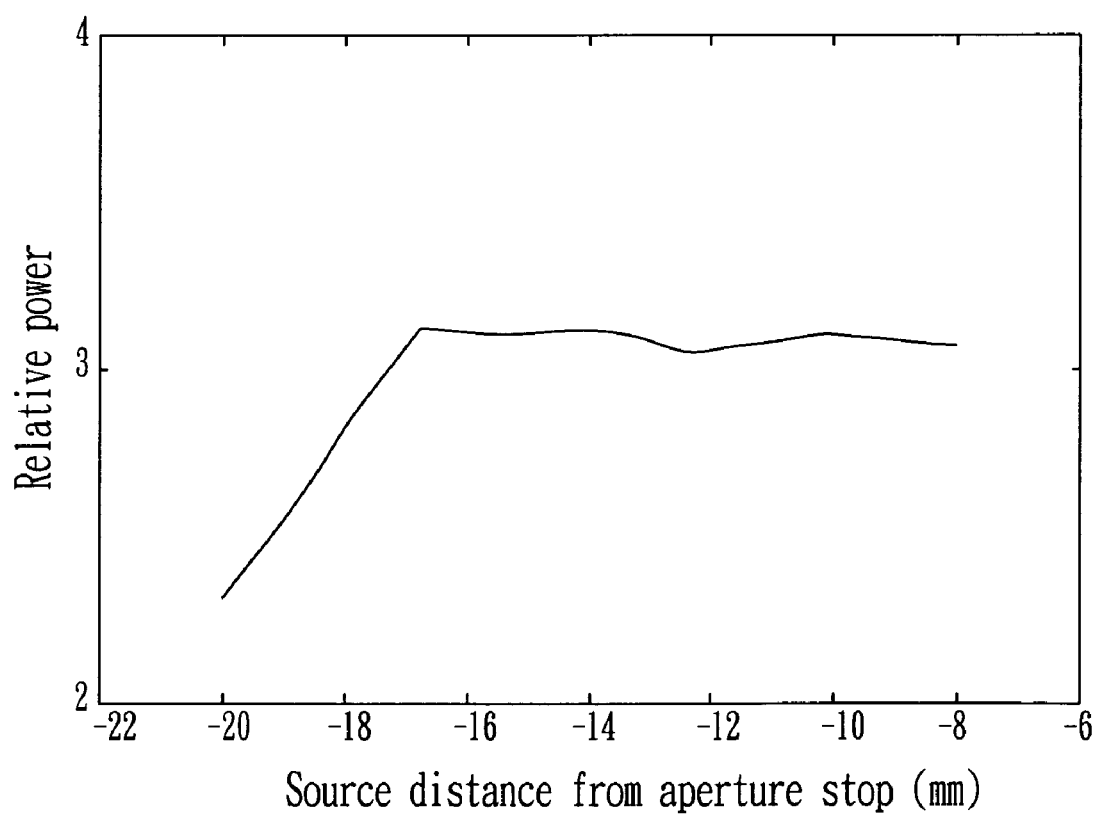
FIG. 6 shows the relation of a flux with an object distance of a color measurement instrument in accordance with a preferred embodiment of the present invention.

With reference to FIG. 6 for the relation of the light intensity of a testing object simulated by the color measurement instrument of the invention and the distance of the testing object, the size of the field stop is adjusted to achieve the effect of moving the sensing platform and the light collection device in a relatively large distance apart, while maintaining the total power of the color sensor to a desired level. Due to the effect of the uniform lens set, each spot is spread uniformly onto the whole color sensor. Even if the illumination at the area of the sensing platform is non-uniform, the color sensor can still maintain a uniform light intensity distribution. It shows that the light collection device of the color measurement instrument in accordance with the present invention adopting the light collection lens set, the uniform lens set, the aperture stop and the field stop allows the sensing platform and the light collection device to have different distances apart, while maintaining the effect of capturing constant and uniform signals by the sensor.

Figure 7:
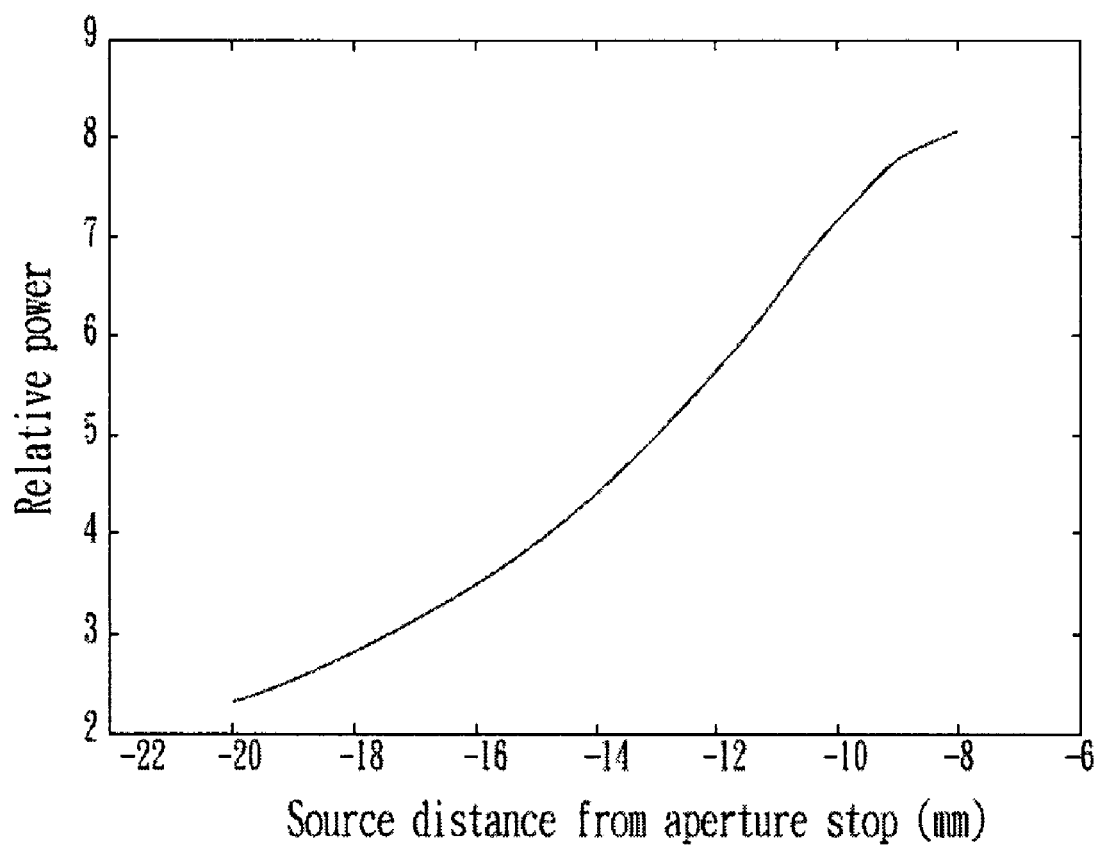
FIG. 7 shows the relation of a flux with an object distance of a conventional color measurement instrument.

In FIG. 7, a plurality of lenses are arranged to form a general light collection device without a special design. If the light collection device is proximate to the sensing platform, the color sensor will receive a stronger light distribution. If the light collection device is far from the sensing platform, the color sensor will receive a weaker light distribution. If the change of intensity of signals captured by the color sensor is too large, then the calculation of the color may be affected to cause substantial errors.

What is claimed is:

1. A color measurement instrument, comprising:
an illumination system, composed of a light emitting element and a light pipe, and the light pipe having an incident surface disposed at an illuminating end of the light emitting element, and an ejected surface for projecting a light with an aslant angle onto a sensing platform of the sensing system;
a sensing system, including a sensing platform, for disposing a testing object, and a light collection device with an appropriate distance from the sensing platform; and the light collection device sequentially comprising an aperture stop; a light collection lens set, for projecting an image of the testing object detected by the sensing platform through the aperture stop onto a field stop; the field stop, for separating a light from an area other than the effective sensing area of the sensing platform; a uniform lens set, for spreading each spot of an image on the field stop onto a whole color sensor; the color sensor, for capturing and analyzing the color to adjust a brightness and a chroma and output an analysis signal.

2. The color measurement instrument of claim 1, wherein the illumination system is installed parallel to the sensing system.

3. The color measurement instrument of claim 1, wherein the light emitting element is a light emitting diode.

4. The color measurement instrument of claim 1 or 3, wherein the light emitting element is a light emitting diode capable of producing a white light.

5. The color measurement instrument of claim 1, wherein the light pipe has a length slightly smaller than the total length of the light collection device of the sensing system.

6. The color measurement instrument of claim 1 or 5, wherein the light pipe has both distal ends as an incident surface and an ejected surface respectively, and both incident surface and ejected surface are aspherical protruding arc surfaces.

7. The color measurement instrument of claim 1, wherein the central line of the ejected light and the sensing platform form an included angle falling within a range from 40° to 50°.

8. The color measurement instrument of claim 1, wherein the light collection lens set comprises one or more convex lenses.

9. The color measurement instrument of claim 1, wherein the light collection lens set comprises one or more convex lenses with an aspherical surface.

10. The color measurement instrument of claim 1, wherein the uniform lens set comprises two or more aspherical lenses.

11. The color measurement instrument of claim 1, wherein the uniform lens set comprises a first lens and a second lens.

12. The color measurement instrument of claim 11, wherein the first lens has upper and lower distal surfaces which are aspherical protruding arc surfaces.

13. The color measurement instrument of claim 11, wherein the second lens has a concave ring disposed at the center of an upper curved surface of the second lens, a protruding arc ring disposed at the periphery of the second lens, a convex protruding status disposed at the center of a cambered surface of the second lens, and a concave ring disposed around the periphery of the second lens.

* * * * *